United States Patent
Bruckart et al.

(10) Patent No.: US 10,805,146 B2
(45) Date of Patent: Oct. 13, 2020

(54) MESH NETWORK

(71) Applicants: Robert C. Bruckart, Melbourne, FL (US); Don W. Bebout, Melbourne, FL (US)

(72) Inventors: Robert C. Bruckart, Melbourne, FL (US); Don W. Bebout, Melbourne, FL (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 19 days.

(21) Appl. No.: 16/250,927

(22) Filed: Jan. 17, 2019

(65) Prior Publication Data

US 2020/0235987 A1    Jul. 23, 2020

(51) Int. Cl.
| | |
|---|---|
| *H04L 12/24* | (2006.01) |
| *H04L 12/18* | (2006.01) |
| *H04L 29/08* | (2006.01) |
| *H04L 29/06* | (2006.01) |

(52) U.S. Cl.
CPC .......... *H04L 41/0659* (2013.01); *H04L 12/18* (2013.01); *H04L 41/20* (2013.01); *H04L 67/12* (2013.01); *H04L 69/16* (2013.01)

(58) Field of Classification Search
None
See application file for complete search history.

(56) References Cited

U.S. PATENT DOCUMENTS

| | | |
|---|---|---|
| 5,872,909 A | 2/1999 | Wilner et al. |
| 5,909,577 A | 6/1999 | Devanbu |
| 6,038,031 A | 3/2000 | Murphy |
| 7,136,927 B2 | 11/2006 | Traversat et al. |
| 7,623,516 B2 | 11/2009 | Chaturvedi et al. |
| 7,996,765 B1 | 8/2011 | Mitnick et al. |
| 2002/0010909 A1 | 1/2002 | Charisius et al. |
| 2003/0023956 A1 | 1/2003 | Dulberg et al. |
| 2003/0214508 A1 | 11/2003 | Aleksic et al. |

(Continued)

OTHER PUBLICATIONS

European Office Action for Application No. 16 720 968.3-1224 dated Jan. 14, 2020.

(Continued)

*Primary Examiner* — Saumit Shah
(74) *Attorney, Agent, or Firm* — Tarolli, Sundheim, Covell & Tummino LLP

(57) ABSTRACT

A system for establishing a mesh network can include one or more computing platforms that initiates execution of a software application for each of a plurality of nodes. Each of the plurality of nodes establishes, by a respective node of the plurality of nodes, a communication link in a mesh network with another node of the plurality of nodes in response to a multicast identification message from the other node. Additionally, each of the plurality of node records, in a token register, a given indication of each node in the plurality of nodes for which a communication link is established and another indication of each node of the plurality of nodes that is identified in one or more multicast identification messages with which a communication link is not established. Further, each of the plurality of nodes broadcasts multicast identification messages on the mesh network.

18 Claims, 18 Drawing Sheets

(56) References Cited

U.S. PATENT DOCUMENTS

| | | |
|---|---|---|
| 2006/0265659 A1 | 11/2006 | Collins et al. |
| 2007/0132779 A1 | 6/2007 | Gilbert et al. |
| 2007/0147334 A1 | 6/2007 | Guthrie |
| 2007/0237089 A1 | 10/2007 | Chen et al. |
| 2008/0091365 A1 | 4/2008 | Tsang et al. |
| 2008/0177756 A1 | 7/2008 | Kosche et al. |
| 2009/0037894 A1 | 2/2009 | Unger |
| 2009/0145172 A1 | 6/2009 | Lubert et al. |
| 2009/0204633 A1 | 8/2009 | Bender et al. |
| 2010/0168874 A1 | 7/2010 | Lucas et al. |
| 2010/0232317 A1* | 9/2010 | Jing .................. H04L 12/2807 370/254 |
| 2011/0216059 A1 | 9/2011 | Espiritu et al. |
| 2012/0011491 A1 | 1/2012 | Eldar |
| 2013/0011076 A1 | 1/2013 | Obzhirov |
| 2014/0033026 A1 | 1/2014 | Sheridan et al. |
| 2015/0026687 A1 | 1/2015 | Yim et al. |
| 2015/0205696 A1 | 7/2015 | Hanckel et al. |
| 2015/0227270 A1 | 8/2015 | Yun et al. |
| 2015/0264554 A1* | 9/2015 | Addepalli ......... H04W 72/0406 370/328 |
| 2015/0347108 A1 | 12/2015 | Munshi et al. |
| 2016/0104204 A1 | 4/2016 | Greenberg et al. |
| 2017/0329730 A1 | 11/2017 | Sadhu |
| 2018/0105271 A1* | 4/2018 | Wypyszynski ....... B64C 39/024 |
| 2018/0212863 A1* | 7/2018 | Akcan ................. H04L 45/026 |
| 2019/0246289 A1* | 8/2019 | Monga ................. H04W 24/08 |

OTHER PUBLICATIONS

Non Final Office Action for U.S. Appl. No. 15/901,486 dated Nov. 22, 2019.
Written Opinion and International Search Report for PCT/US2019/065505 dated Mar. 4, 2020.
Non Final Office Action for U.S. Appl. No. 16/178,345 dated Apr. 6, 2020.
Final Office Action for U.S. Appl. No. 15/901,486 dated Mar. 31, 2020.
Final Office Action for U.S. Appl. No. 16/178,345 dated Aug. 21, 2020.

\* cited by examiner

MESH NETWORK

TECHNICAL FIELD

The present disclosure relates to computer networks. More particularly, this disclosure relates to a system and method for establishing and maintaining a mesh network.

BACKGROUND

A computing platform or digital platform refers to the environment in which a piece of software is executed. A computing platform may be the hardware or the operating system (OS), even a web browser and associated application programming interfaces, or other underlying software, as long as the program code is executed with it. Computing platforms have different abstraction levels, including a computer architecture, an OS, or runtime libraries. A computing platform is the stage on which computer programs can run.

Middleware is computer software that provides services to software applications beyond those available from the operating system. It can be described as "software glue". Middleware makes it easier for software developers to implement communication and input/output. The term middleware commonly refers to software that enables communication and management of data in distributed applications. As one definition, middleware is "those services found above the transport (e.g., over TCP/IP) layer set of services but below the application environment" (e.g., below application-level APIs). In this more specific sense middleware can be described as the dash ("-") in client-server, or the -to- in peer-to-peer. Middleware includes web servers, application servers, content management systems, and similar tools that support application development and delivery.

SUMMARY

One example relates to a system for establishing a mesh network. The system can include one or more computing platforms that initiates execution of a software application for each of a plurality of nodes. Each of the one or more platforms can also establish, by a respective node of the plurality of nodes, a communication link in the mesh network with another node of the plurality of nodes in response to a multicast identification message from the other node. Each of the one or more platforms can also record, in a token register, a given indication of each node in the plurality of nodes for which a communication link is established and another indication of each node of the plurality of nodes that is identified in one or more multicast identification messages with which a communication link is not established. Each of the one or more platforms broadcasts multicast identification messages on the mesh network in response to the initiation of a respective node. A given multicast identification message from a respective node includes a given identifier for each node of the plurality of nodes for which the respective node established a communication link and another identifier for each node identified in the one or more multicast identification messages with which the respective node has not established a communication link.

Another example relates to a system for establishing a mesh network that includes a plurality of nodes of the mesh network, wherein each of the plurality of nodes executes on one or more computing platforms, wherein, upon coming online, each of the plurality of nodes broadcasts multicast identification messages on the mesh network, wherein each multicast identification message includes a unique identifier of a respective node and a data characterizing a current state of a token register for the respective node. Each of the plurality of nodes establishes, by a respective node of the plurality of nodes, a communication link in the mesh network with another node of the plurality of nodes in response to a multicast identification message from the other node. Each of the plurality of nodes records, in the respective token register, a given indication of each node in the plurality of nodes for which a communication link is established and another indication of each node of the plurality of nodes that is identified in one or more multicast identification messages from which a multicast identification message has not been received.

Yet another example relates to a method for establishing a mesh network. The method can include initiating, at a first node of a mesh network, execution of an application. The method can also include broadcasting, after the initiating, a multicast identification message to each node on the mesh network. The method can further include receiving, by the first node, a first multicast identification message broadcast by a second node on the mesh network. The method can yet further include determining, by the first node, that a communication link is not established with the second node in response to receipt of the first multicast identification message. The method can still yet further include establishing, by the first node, a communication link with the second node on a port identified in the first multicast identification message broadcast by the second node in response to determining that a communication link is not established with the second node. The method can further yet still include receiving, by the first node, a second multicast identification message broadcast by the second node on the mesh network after the establishing. The method can further still include adding, by the first node, an indication that a communication link has been established with the second node in response to receipt of the second multicast identification message.

DETAILED DESCRIPTION

Figure 1:
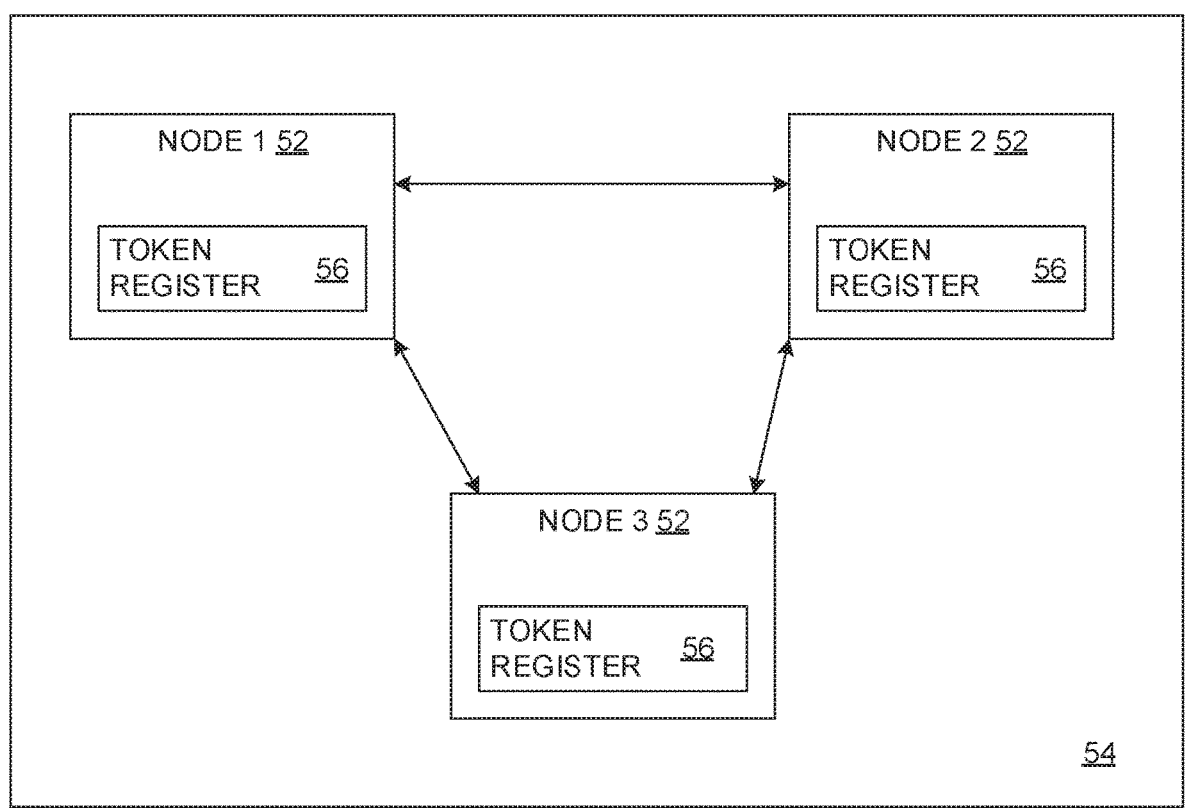
FIG. 1 illustrates an example of a system for establishing and maintaining a mesh network.

The present disclosure relates to systems and methods for establishing and maintaining a mesh network amongst a plurality of nodes. The system includes one or more computing platforms that each initiates execution of a software application on each of the plurality of nodes in a non-deterministic order. Upon each node coming online (the software application completing the initiation process), the respective node broadcasts multicast identification messages to other nodes on the mesh network at a transient state rate. Each multicast identification message includes a unique identifier for the corresponding node (e.g., a network address and an open port number) and data characterizing a token register of the corresponding node.

Additionally, in response to receipt of a multicast identification message, each node examines the corresponding token register to determine if a communication link has been established with the node that broadcast the respective multicast identification message, which node is referred to as a broadcasting node. If a communication link has not been established with the broadcasting node, each node that received the multicast identification message (which can be referred to as receiving nodes) establishes a communication link with the broadcasting node based on the unique identifier of the broadcasting node (e.g., the network address and open port). Additionally, in response to a subsequent multicast identification message from the broadcasting node, each receiving node adds the broadcasting node to the token register, along with an indication that a communication link has been established between the receiving node and the broadcasting node. Further, in response to each multicast identification message, each receiving node adds an indication of other nodes (if any) identified in the multicast identification message for which a communication link has not been established to the corresponding token register. Accordingly, the token register in each receiving node includes an indication of nodes identified in a multicast identification message, but where no (direct) communication link is established. This process continues until there is a communication link between each (online) node in the mesh network, such that the mesh network is a fully connected mesh network.

Additionally, after a fully connected mesh network is established, each of the node on the mesh network reduces a rate of broadcasting the multicast identification messages from the transient state rate to a steady state rate to reduce network traffic. However, if at some point in the future a given node in the mesh network may detect a failed communication link between the given node and a particular node, and the given node removes the particular node from the token register and changes the rate of the broadcast messages from the steady state rate to the transient state rate. By implementing the systems and methods described herein, a serverless mesh network without a single point of failure can be established and maintained. Furthermore, as noted, nodes on the mesh network can be initiated in a nondeterministic manner (e.g., an unpredictable order).

FIG. 1 illustrates an example of a system 50 for establishing and maintaining a peer-to-peer (e.g., serverless) fully connected mesh network of N number of nodes 52, where N is an integer greater than or equal to two. As used herein, the term "fully connected mesh network" indicates that each node 52 eventually has a direct connection to every other node 52.

The N number of nodes 52 can be representative of software services (e.g., an application and middleware) that execute on a computing platform 54. Although FIG. 1 illustrates one computing platform, it is understood that there could be multiple computing platforms. As one example, the system 50 could be implemented on an aircraft, wherein each of the N number of nodes 52 represent different software services for controlling a different portion of the aircraft.

Each of the nodes 52 can include a middleware application to facilitate communications between nodes 52. The middleware can provide an isolated runtime environment for a software application executing thereon. In some examples, each of the N number of nodes 52 can communicate with a standard communications protocol such as a communication protocol within the Transmission Control Protocol Internet Protocol (TCIP/IP) stack. More specifically, in some examples, the nodes 52 can communicate via the Transmission Control Protocol (TCP) or the User Datagram Protocol (UDP).

As used herein, the phrase "comes online" indicates that a corresponding node 52 has completed execution of a startup process and is ready to communicate with other nodes on the mesh network. Similarly, the phrase "goes offline" indicates that the corresponding node cannot communicate with other nodes on the mesh network. Upon an initial startup of the computing platform 54, each of the N number of nodes 52 are initiated. Moreover, at least two of the N number nodes 52 come online (e.g., complete a startup process) in a nondeterministic order. Stated differently, at least two of the nodes complete an initial startup sequence in an unpredictable order. As an example, on a first startup of the computing platform 54, node 2 may complete its startup process after node 3 such that node 3 is online prior to node 2. Further, on a second startup of the computing platform, node 2 may complete its startup process before node 3, such that node 2 is online prior to node 3. The sequence of starting each of the N number of node 52 can be based, for example, on factors (e.g., network latency, operating system priorities and/or environmental factors) that may be outside of the control of the computing platform 54.

Each node 52 stores a token register 56 that tracks nodes 52 on the mesh network. More particularly, the token register 56 of each node 52 stores data that identifies information characterizing the node 52 associated with the token register 56. Additionally, the token register 56 of each node 52 stores data for nodes 52 on the mesh network that have established a communication link with the node 52 associated with the token register 56. Further, the token register 56 of each node 52 stores data for nodes 52 on the mesh network that have not established a communication link with the node 52 associated with the token register 56 but have been identified in a multicast identification message from at least one other node 52. Stated differently, for a given node 52, the token register 56 for the given node identifies (i) the given node 52 (itself) (ii) each other node 52 that the given node 52 has established communication link with and (iii) each node 52 for which a communication link has not been established, but has been identified in a multicast identification message from another node 52.

From the time the computing platform 54 is initialized, and until the mesh network is a fully connected mesh network, each of the N number of nodes 52 operates in a transient state. In the transient state, each of the N number of nodes 52, upon completing the corresponding startup procedure, broadcasts a multicast identification message to each active node in the mesh network at a transient state rate. Each of the (broadcasted) multicast identification messages includes a unique identifier of node 52 that broadcast the multicast identification message. The unique identifier can be a network address (IP address) and data characterizing an open port on the node 52 that broadcast the multicast identification message. Each node 52 is configured such that a one-way communication link can be established with the given node through the open port identified in the broadcasted multicast identification messages.

As a given example (hereinafter, "the given example"), it is presumed that node 1 comes online (e.g., completes the startup process) first, node 3 comes online second and node 2 comes online third. In the given example, upon completing the startup process, node 1 broadcasts the multicast identification messages at the transient state rate. Initially, since node 1 is the first node 52 of the N number of nodes 52 to come online, the multicast identification messages are not received by node 3 or node 2.

Continuing in the given example, upon node 3 coming online (e.g., completes the startup process), node 3 receives the next multicast identification message broadcast by node 1. In response to receiving the next multicast identification message, node 3 establishes (opens) a communication link from node 3 to node 1. The communication link could be a TCP connection, a UDP connection or a connection using a different protocol. Additionally, in response to receipt of a subsequent multicast identification message broadcast by node 3, node 1 updates the token register of node 1 to add an indication that a communication link has been established with node 3.

Further, continuing with the given example, node 3 also broadcasts the multicast identification messages at the transient state rate. Since node 2 is not yet online (e.g., has not completed the startup process) node 2 does not receive the multicast identification message from node 3. However, since at this point in the given example, node 1 is online, node 1 receives the multicast identification message. The multicast identification message from node 3 includes the unique identifier of node 3 and data characterizing the token register 56 of node 3. The unique identifier includes a network address (e.g., IP address) and an open port number for a communication link to node 3. More generally, the unique identifier sent by a given node 52 in a multicast identification message includes information for establishing a communication link with the given node. In response to receipt of the multicast identification message, node 1 opens a communication link with node 3. Additionally, in a subsequent multicast identification message, node 1 provides data characterizing the token register 56 of node 1 to node 3 as well as the unique identifier of node 1 (e.g., the IP address and open port number). In response to receipt of the data characterizing the token register 56 of node 1, node 3 updates the token register 56 of node 3. More particularly, node 3 adds an indication to the token register 56 that a communication link has been established with node 1.

Continuing with the given example, at a subsequent time, node 2 comes online. Upon coming online, node 2 broadcasts a multicast identification message that includes the unique identifier (e.g., IP address and open port number) of node 2. In the given example, it is presumed that node 1 receives the first multicast identification message from node 2, but that node 3 does not receive the multicast identification message. The multicast identification message may not be received by every online node 52 on the mesh network due to communication collisions and/or lost packets on the mesh network. Thus, in response to the multicast identification message, node 1 establishes a communication link with node 2 and provides the data characterizing the token register 56 of node 1 to node 2 in a subsequent multicast identification message.

In response to receipt of the data characterizing the token register 56 of node 1, node 2 updates the token register 56 of node 2. In particular, node 2 adds an indication to the token register 56 that a communication link has been established with node 1 and another indication for node 3 indicating that node 3 is on the mesh network, but that a communication link has not been established with node 3. That is, at this point of the given example, the token register of node 3 has two different indicators, a given indicator for nodes 52 in the mesh network that have established communication links with and another indicator for nodes for which a communication link has not been established, but for which another node (e.g., node 1) has identified as being a member of the mesh network.

Continuing with the given example, in a subsequent multicast identification message, node 1 provides data characterizing an updated status of the token register of node 1 to node 3. In response to the data characterizing the updated token register 56 of node 1, node 2 updates the token register 56 of node 2. In particular, node 2 stores data in the token register 56 indicating that node 3 is a member of the mesh network, and that no communication link has been established with node 2.

Continuing with the given example, each of the N number nodes 52 continues to broadcast the multicast identification messages at the transient state rate. It is noted that the transient state rate may be the same or different for different nodes 52. At some point, it is presumed that a multicast identification message broadcast by node 3 is received at node 2. In response, node 2 establishes a communication link with node 3. Additionally, in a subsequent multicast identification message, node 2 provides the unique identifier of node 2 (e.g., the IP address and open port number) and data characterizing the token register 56 to node 3. In response, node 3 establishes a communication link with node 2 and in a subsequent multicast identification message, provides the unique identifier (e.g., IP address and open port number) of node 2 and data characterizing the token register of node 2 to node 3. In response to the subsequent multicast identification message, node 2 modifies its token register 56 to record that a communication link is established with node 3. Thus, at this point in the given example, direct, bi-directional communication is established between each node 52 of the mesh network. Accordingly, the mesh network is fully connected mesh network.

In subsequent multicast identification messages broadcast by each node 52 of the system 50, the data characterizing the corresponding token register 56 identifies every node on the mesh network. Thus, after a predetermined amount of time (e.g., 5-10 seconds), the mesh network is considered to be in a steady state. In such a situation, after the predetermined amount of time, each node 52 can reduce the rate of broadcasting the multicast identification messages from the transient state rate to a steady state rate. As one example, in the steady state rate, each node 52 broadcasts the multicast identification messages at a rate that is at least one-half less than the transient state rate to reduce network traffic on the mesh network. Thus, if a given node 52 broadcasts the multicast identification messages at a rate of one (1) message per second in the transient state rate, the given node would broadcast the multicast identification messages at a steady state rate of one (1) message every two (2) seconds or slower.

Continuing with the given example, it is presumed that at some point in time, after achieving the steady state, node 3 goes offline (becomes disabled). In one example, node 3 may go offline, for example, due to a failure in software executing on node 3. In another example, node 3 may go offline in a situation where an aircraft has sustained damage in a region where physical components of the system 50 support node 3. In any such event, upon either node 1 or node 2 (the remaining function nodes 52) attempting to send a message to the offline node (node 2), the attempt fails. Such a failure could be detected, for example, with a lack of acknowledgement to the message sent.

Continuing with the given example, it is presumed that node 2 detects that node 3 is not responding to messages. In such a situation, node 2 removes node 3 from node 3's token register 56, and node 2 switches back to the transient state, wherein node 3 broadcasts multicast identification messages at the transient state rate that includes data characterizing the token register 56 in the updated state. In response to receipt of the multicast identification message, node 1 examines the data characterizing the token register 56 of node 2 and identifies that node 2 is missing. In response, node 1 can attempt to send a message to node 3. Since node 3 is disabled in the given example, the attempt fails. In response, node 1 can remove node 3 from the token register 56 and return to the transient state, such that multicast identification messages are broadcast at the transient state rate.

Continuing with the given example, upon both remaining online nodes 52 (node 1 and node 2) detecting that the corresponding token registers do not contain any other nodes in the mesh network, the mesh network returns to the steady state. In the given example, in the steady state, both nodes, nodes 1 and 2 reduce the rate of transmitting the multicast identification messages from the transient state rate to the steady state rate.

By implementing the system 50, the fully connected mesh network can be established quickly without employment of a server. Moreover, as noted, there is no requirement of any order in which the nodes 52 are activated and/or complete a startup process. That is, each node 52 on the mesh network can be brought online in any order and/or non-deterministically. Furthermore, the system 50 does not have a single point of failure. Rather, the system 50 is serverless, such that each node 52 can communicate with other nodes 52 without an intermediary system. Furthermore, the middleware can be configured such that messages from an application executing on the middleware are delayed until the intended recipient of the message (e.g., another application) comes online.

Figure 2A:
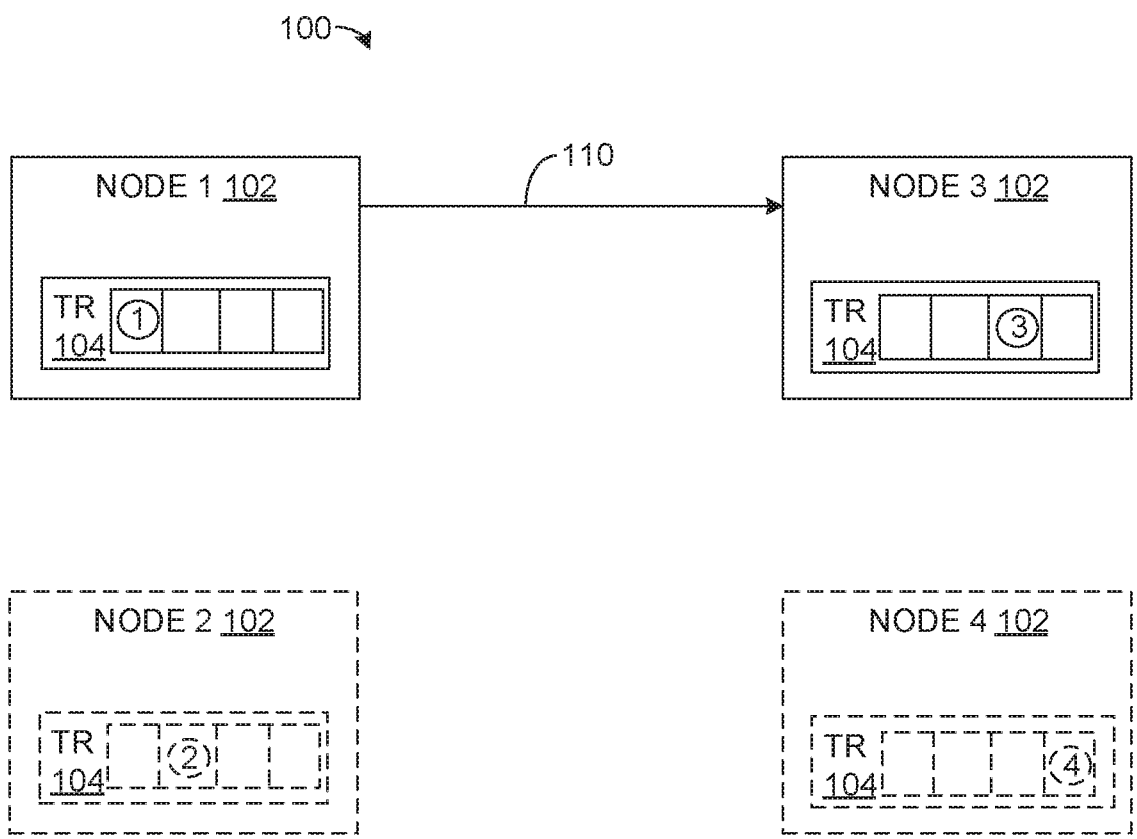
FIGS. 2A-2N illustrates another example of a system for establishing and maintaining a mesh network.
Figure 2B:
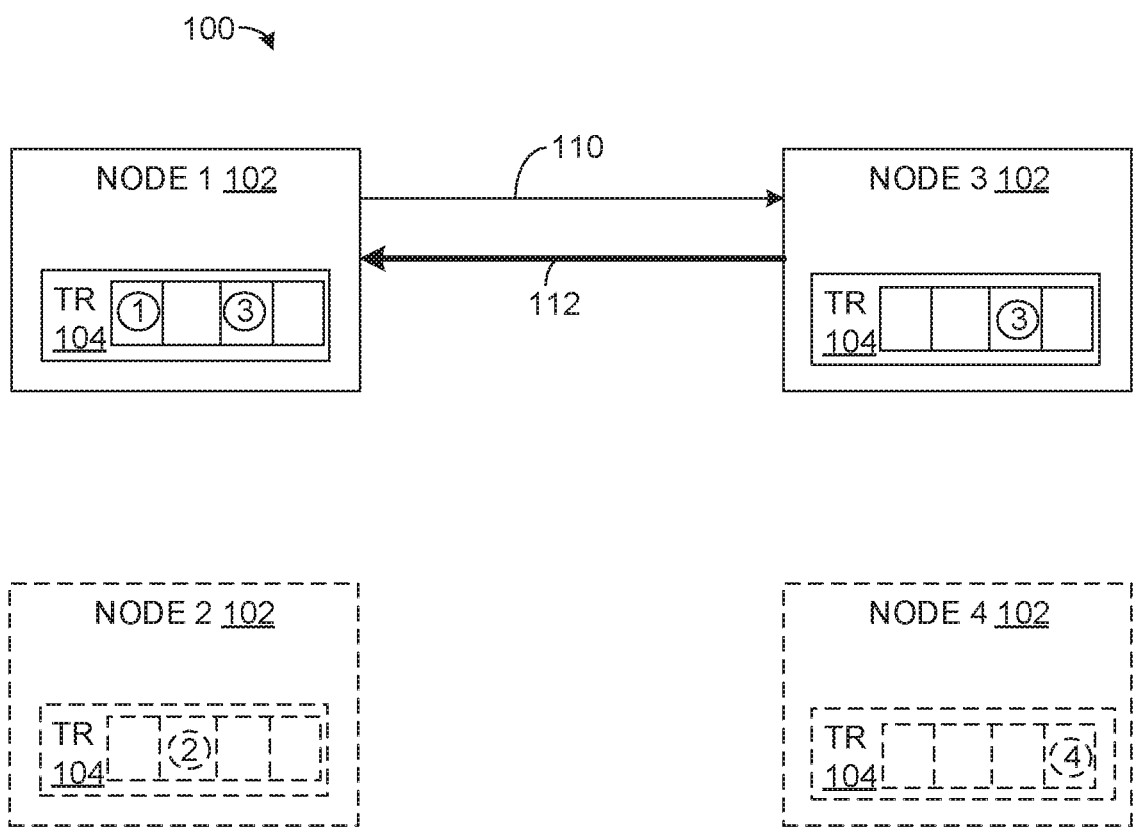
Figure 2C:
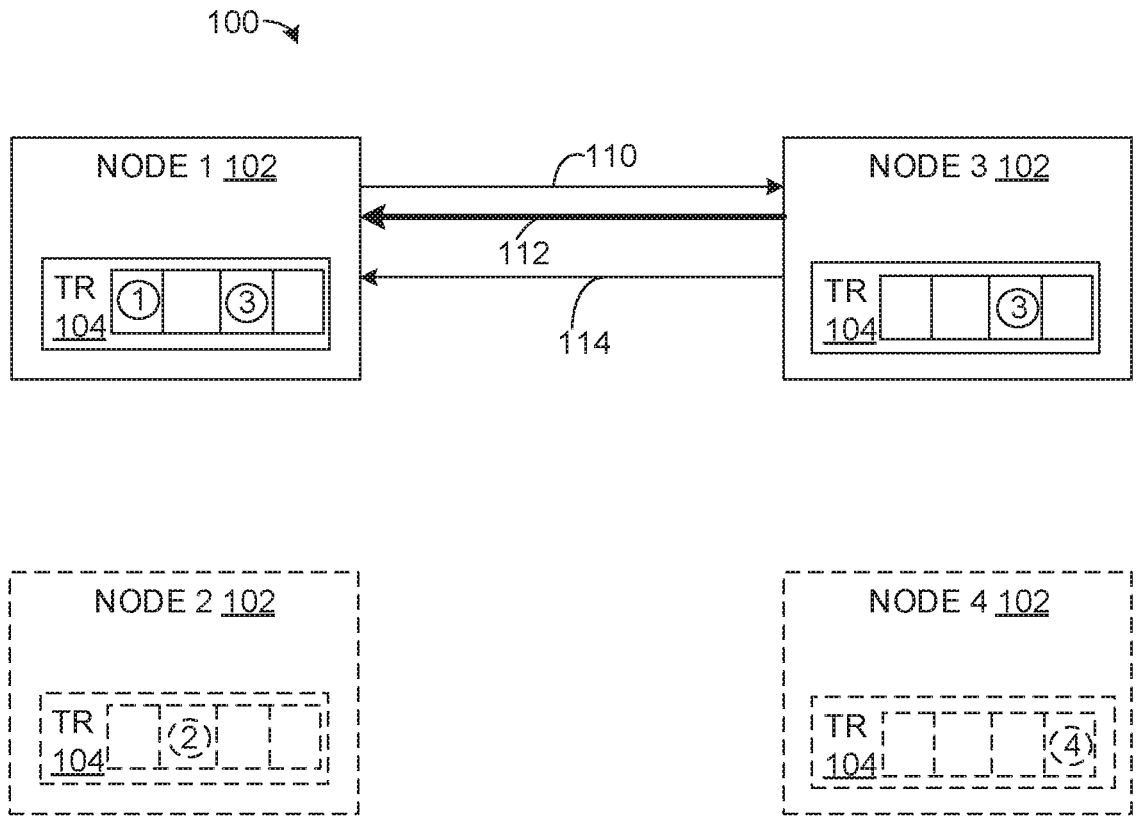
Figure 2D:
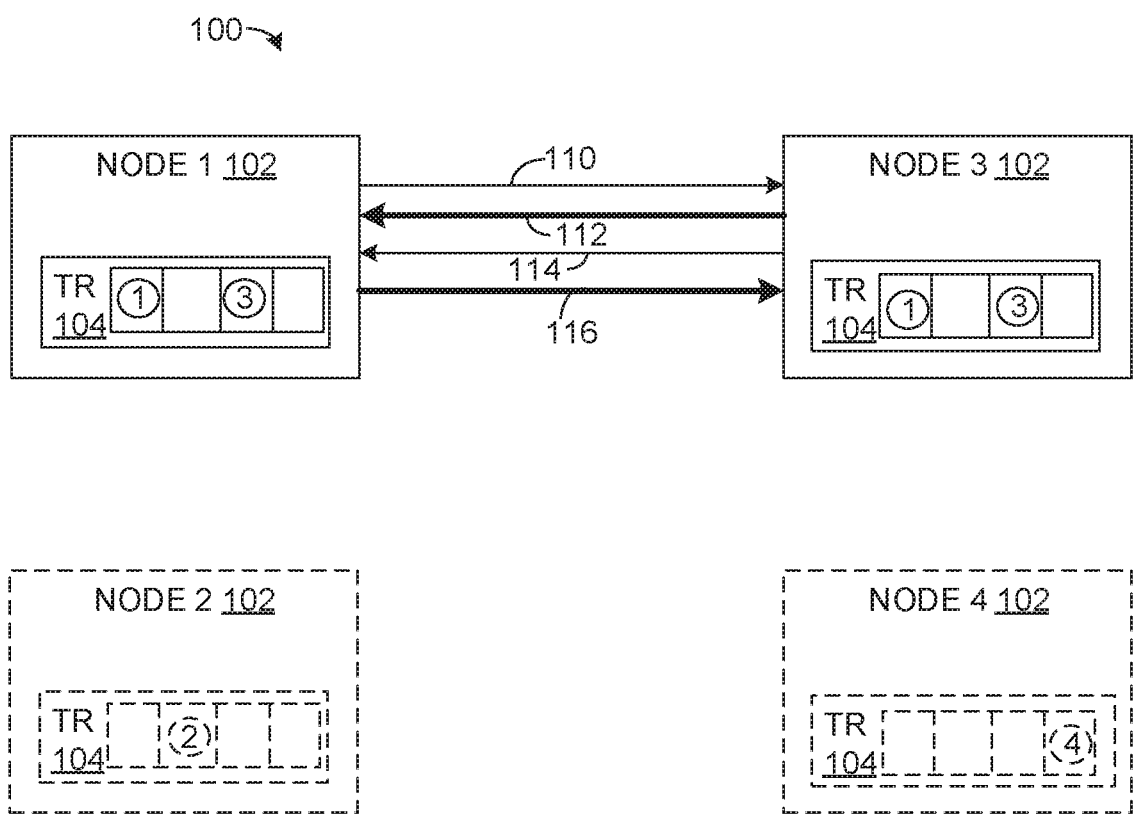
Figure 2E:
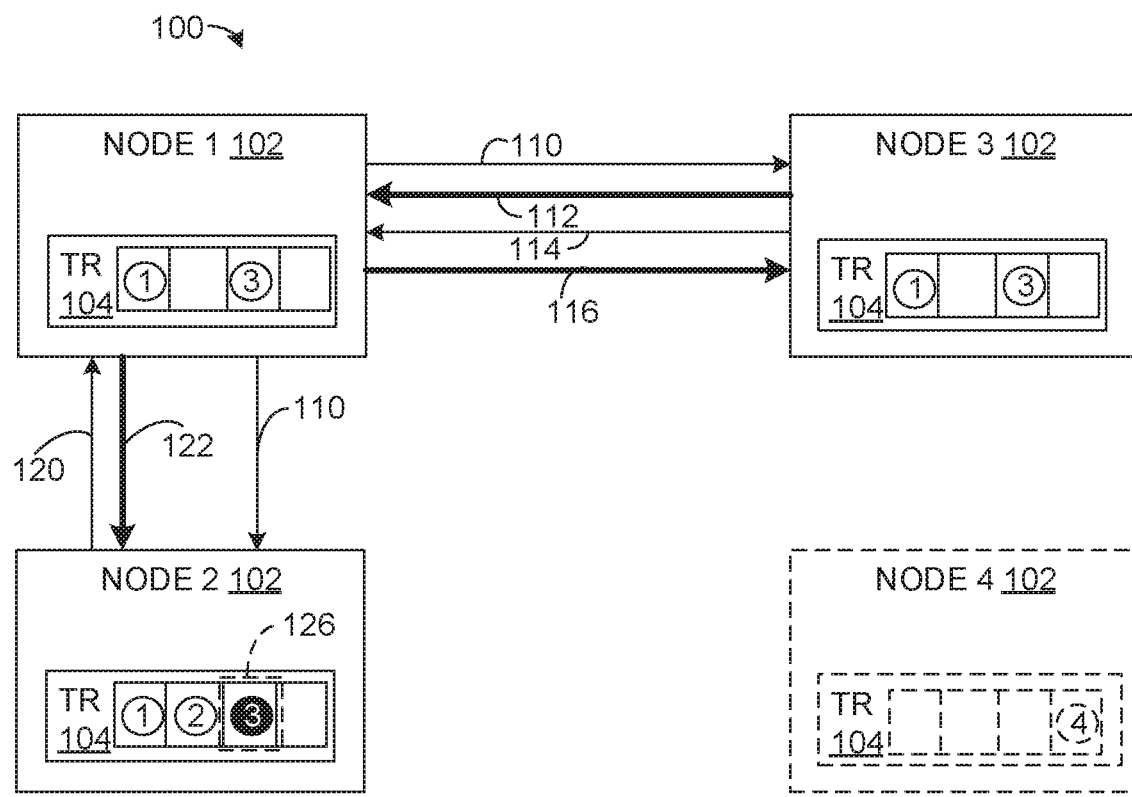
Figure 2F:
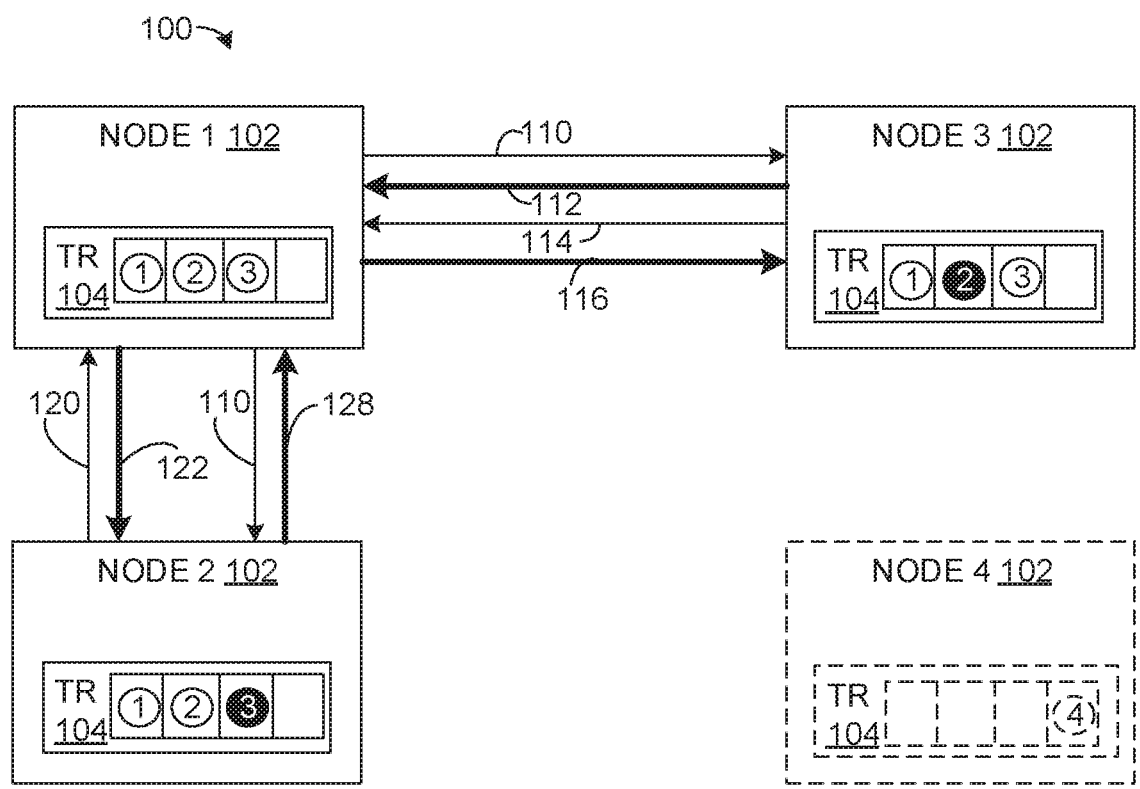
Figure 2G:
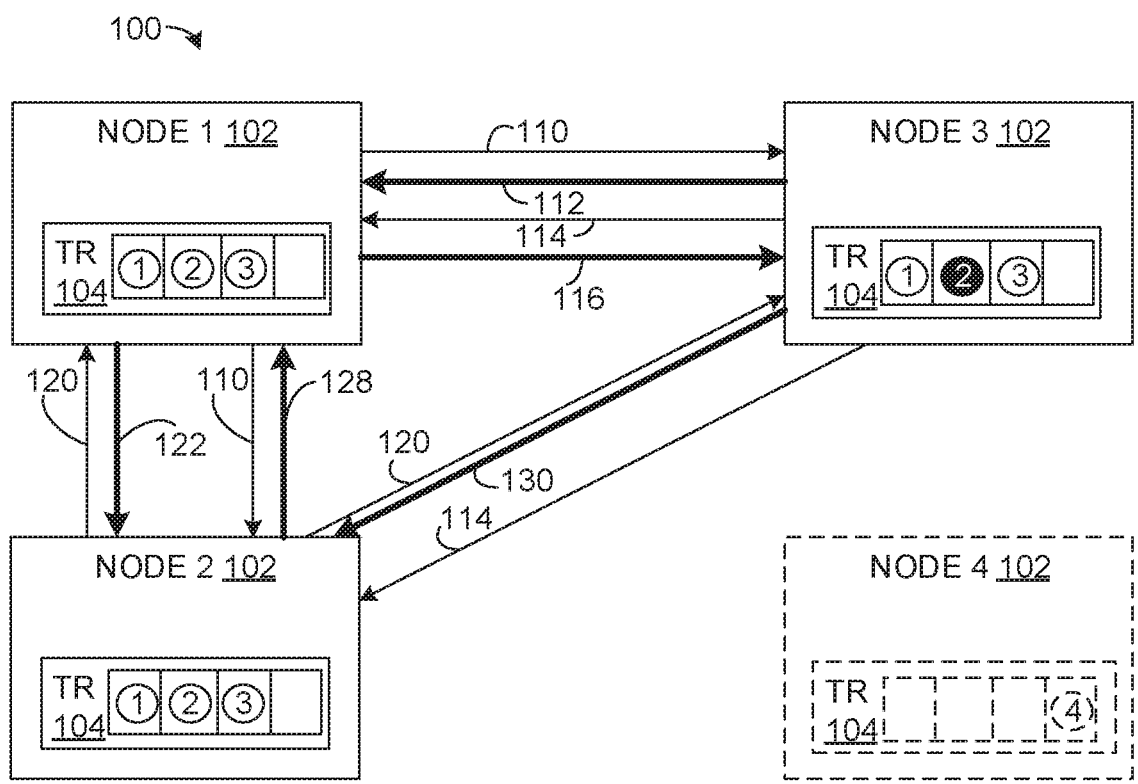
Figure 2H:
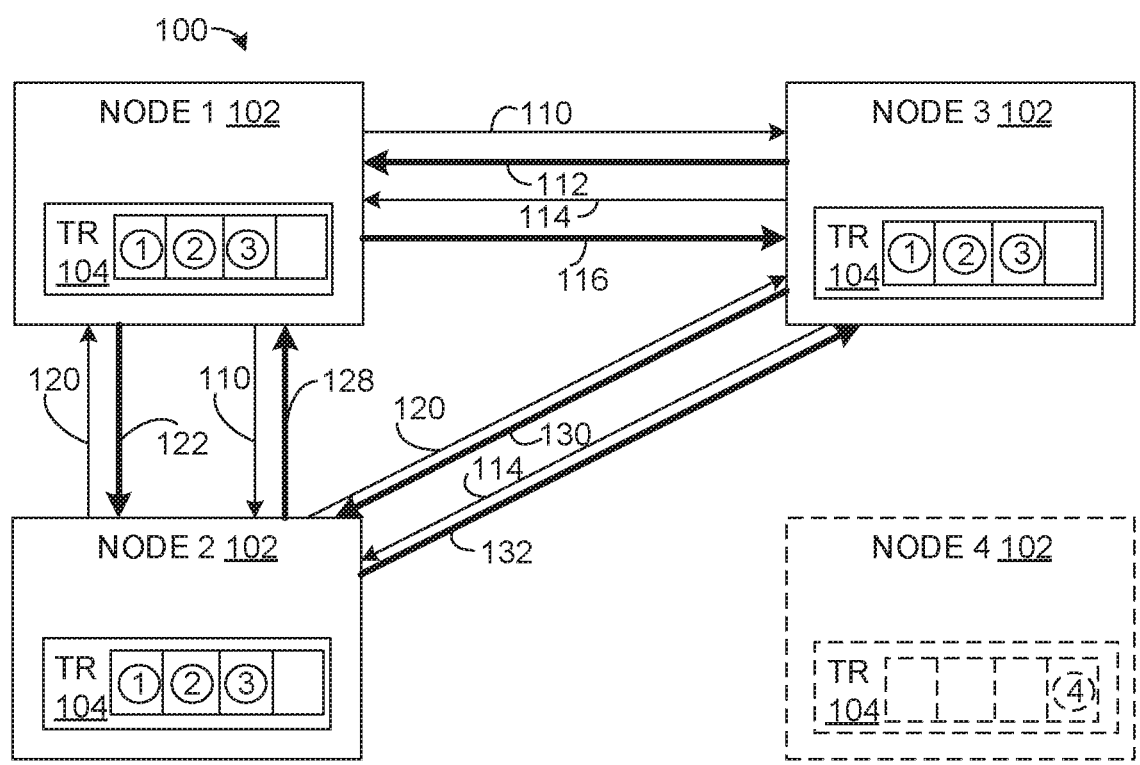
Figure 2I:
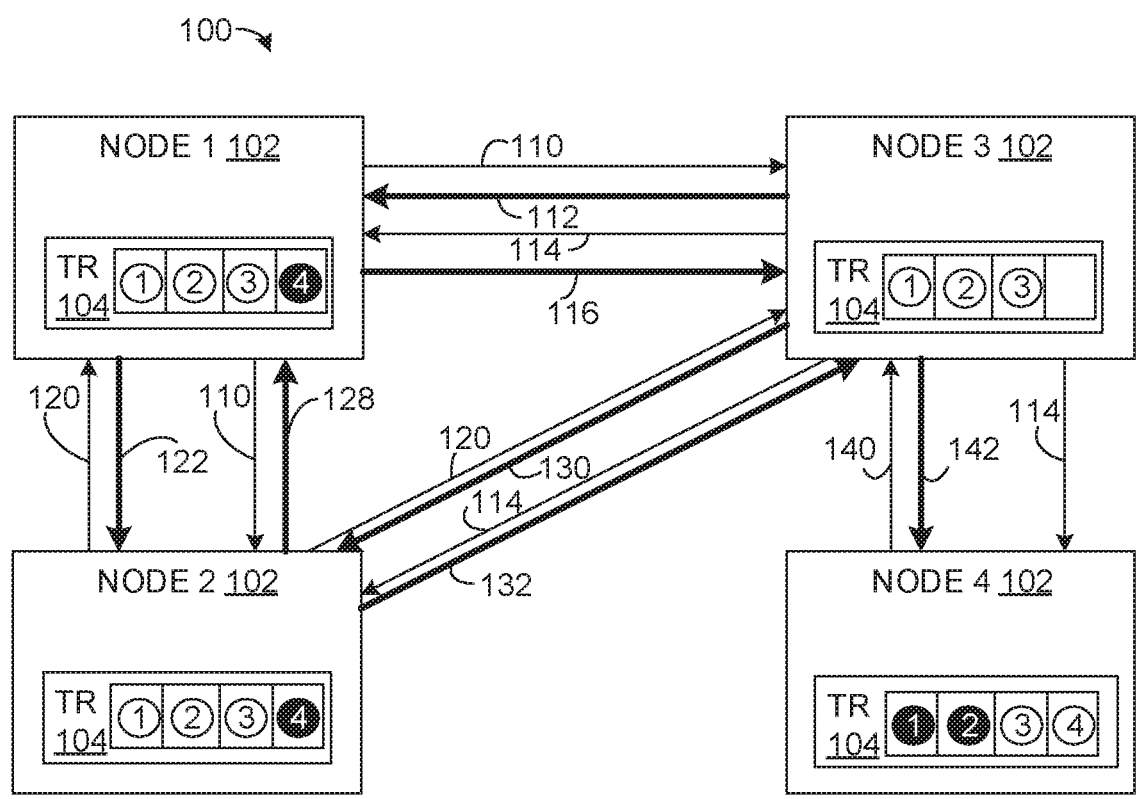
Figure 2J:
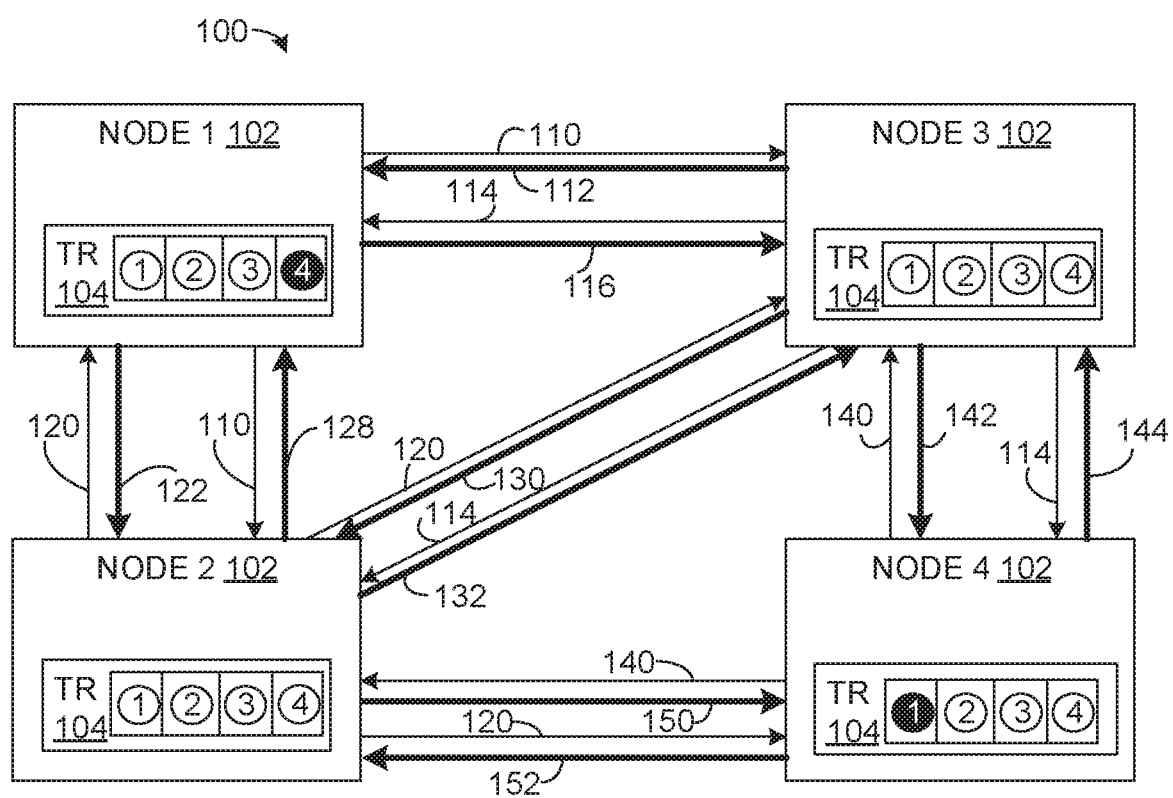
Figure 2K:
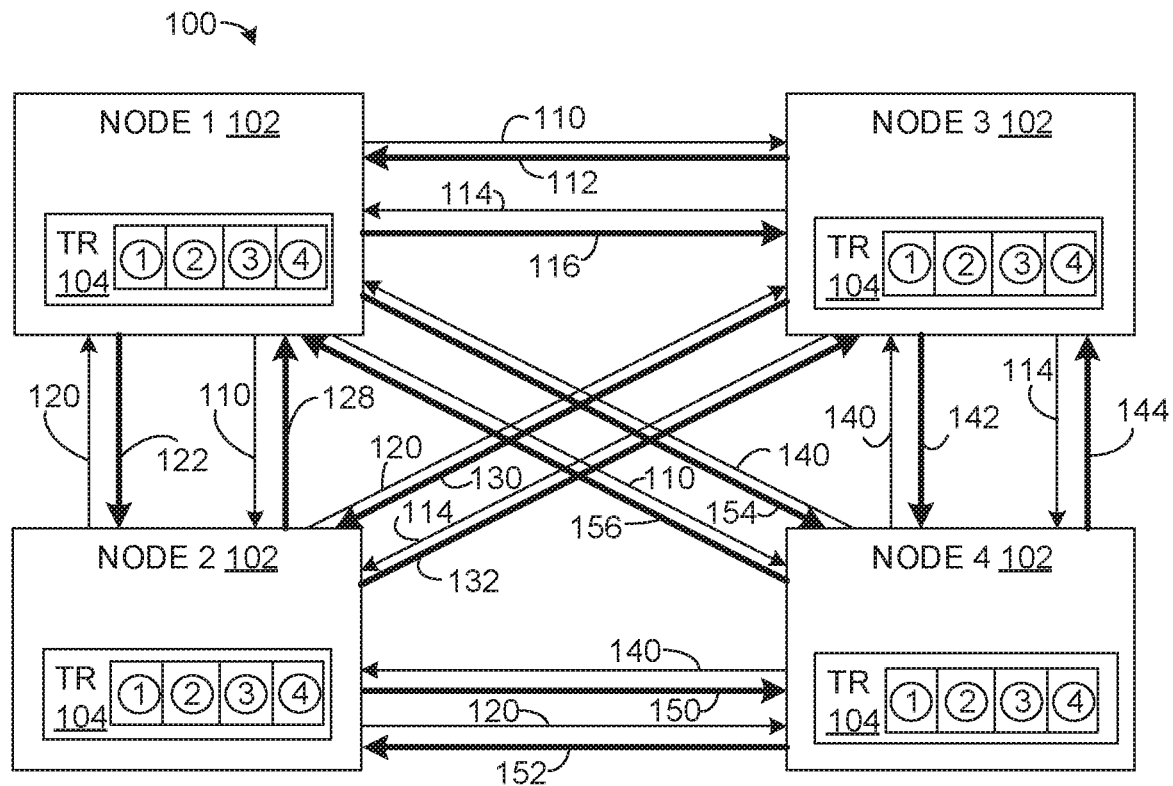
Figure 2L:
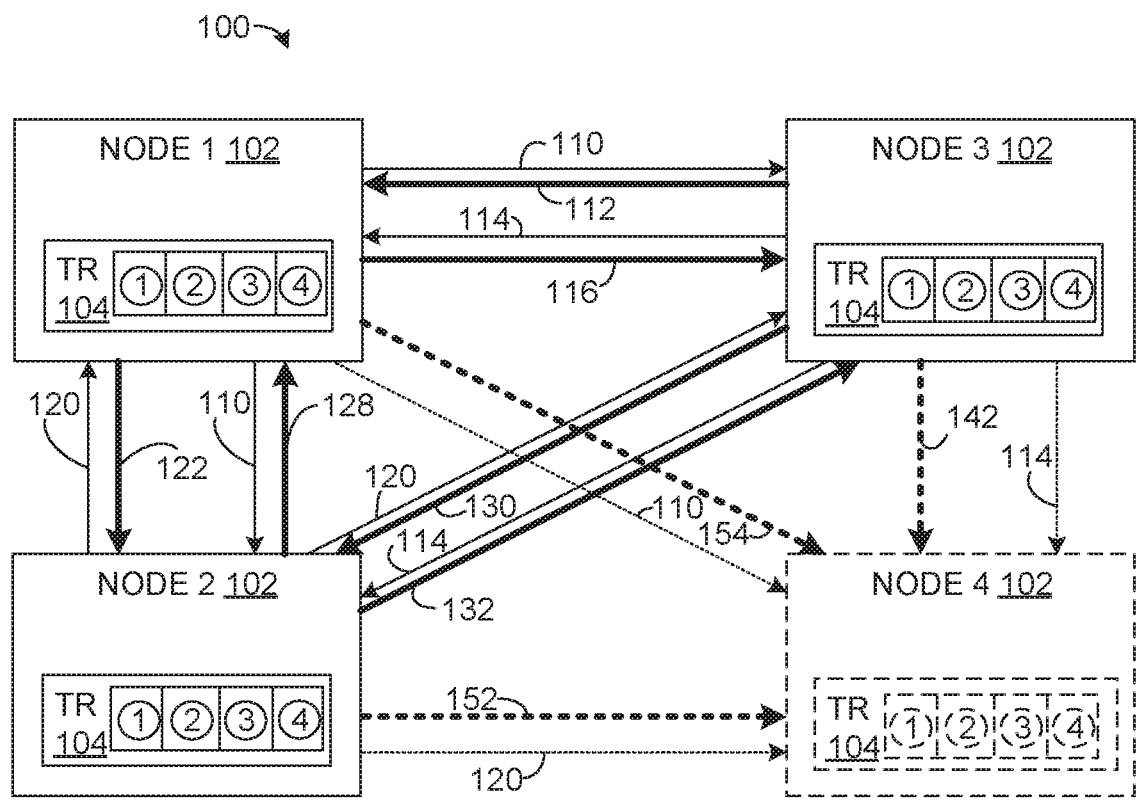
Figure 2M:
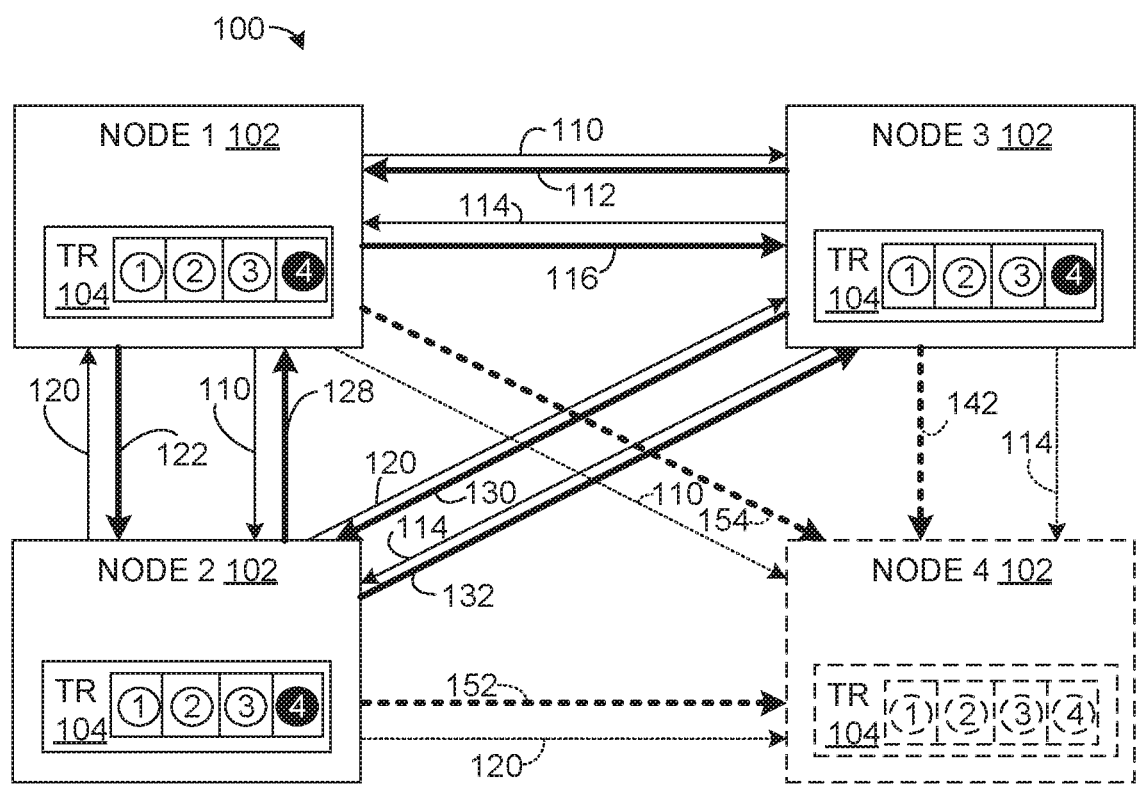
Figure 2N:
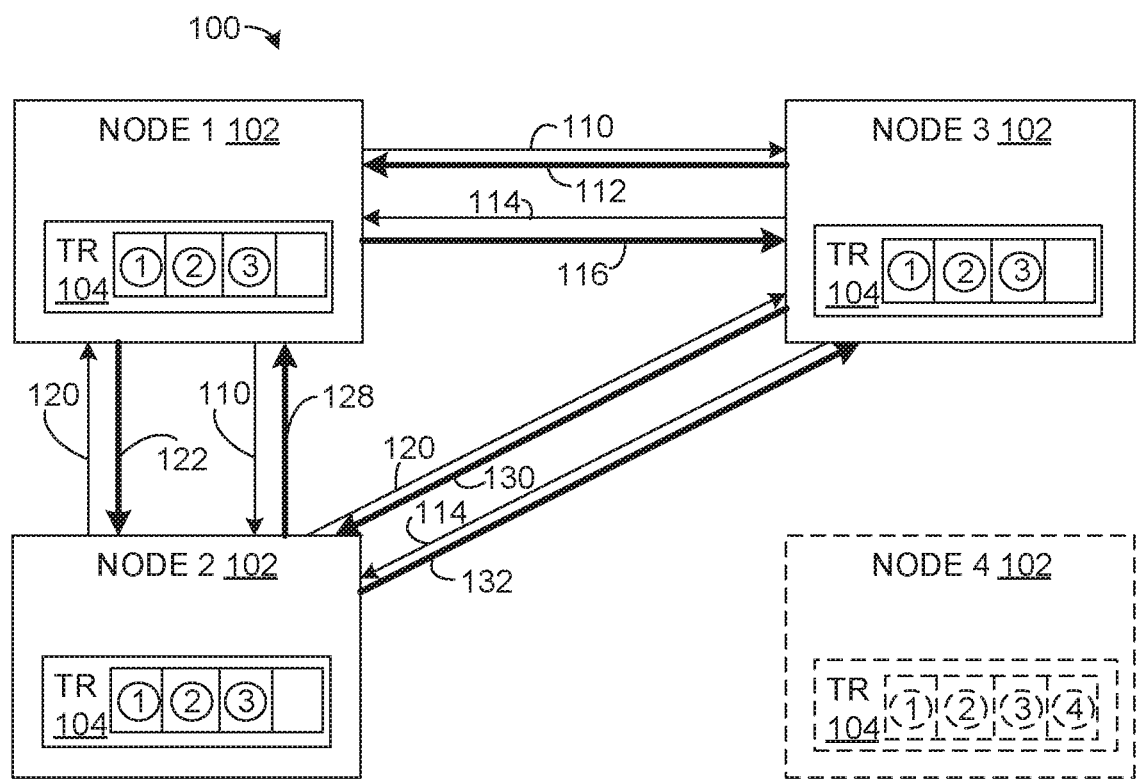

FIGS. 2A-2N illustrate an example of a system 100 for establishing and maintaining a fully connected mesh network amongst a plurality of nodes 102. In the example illustrated, there are four (4) nodes 102. However, in other examples, there could be more or less nodes 102. The nodes 102 can be employed to implement the nodes 52 of FIG. 1. The nodes 102 can be representative of software services executing on a computing platform. Each software service can operate on a middleware that facilitates communication between the nodes 102. Each node 102 includes a token register 104 (labeled "TR" in FIGS. 2A-2N). It is understood that throughout FIGS. 2A-2N, nodes 102 that are illustrated with solid lines (such as node 1 and node 2 in FIG. 2A) are considered to be online (completed a startup process). Moreover, throughout the example illustrated in FIGS. 2A-2N, nodes 102 with dashed lines (such as node 2 and node 4 of FIG. 2A) are considered to be offline (e.g., disabled and/or not completed a startup process).

Each token register 104 includes an identification of the corresponding node 102, and a given indication for nodes 102 (if any) within the mesh network with which the corresponding node 102 has established a communication link. Additionally, each token register 104 includes another indication for nodes (if any) within the mesh network that have been identified by another node 102, but where a communication link is not established.

In FIG. 2A, it is presumed that the network is in a transient state. In particular, as noted, in FIG. 2A it presumed that node 1 and 3 are online (completed a startup process) as indicated by solid lines, while nodes 2 and 4 are offline, as indicated by the dashed lines. In FIG. 2A, node 1 broadcasts a multicast identification message, as indicated by an arrow 110. Since node 2 and node 4 are offline, node 3 receives the multicast identification message 110. The multicast identification message 110 can include a unique identifier (e.g., an IP address and an open port number) and a token register for the node 102 broadcasting the multicast identification message 110. In response to the multicast identification message 110, as illustrated in FIG. 2B, node 3 establishes a communication link with node 1 that is indicated by an arrow 112 on the open port identified in the multicast identification message from node 1.

As illustrated in FIG. 2C, in a next multicast identification message 110 broadcast by node 3 indicated by an arrow 114 includes data characterizing the token register 104 of node 3. Since node 3 established the communication link 112 with node 1 and node 3 and node 1 received the data characterizing the token register 104 of node 3, node 1 adds node 3 to the token register 104 of node 1. More particularly, node 1 adds node 3 to the token register 104 along with the given indication that a communication link 112 has been established with node 3. As illustrated in FIG. 2D, node 1 establishes a communication link with node 3 on the open port of node 3 indicated by an arrow 116. Additionally, in a subsequent multicast identification message 110, node 1 provides data characterizing the token register 104 of node 1, which identifies node 1 and node 3. In response, node 3 adds node 1 to the token register 104 of node 3 along with a given indication that communication link has been established with node 1.

Furthermore, in FIG. 2D, direct, bi-directional communication is established between each node 102 that is online. Accordingly, in an example where no additional nodes 102 come online within a threshold time (e.g., 5-10 seconds), the resultant mesh network is a fully connected mesh network between two nodes 102. Thus, the mesh network is in the steady state, and in such a situation, node 1 and node 3 reduce a rate of broadcasting the multicast identification messages from a transient state rate to a steady state rate. However, in FIG. 2E it is presumed that node 2 comes online causing node 1 and node 3 to return to the transient state.

More particularly, in FIG. 2E, upon node 2 coming online, node 2 broadcasts a multicast identification message, as indicated by an arrow 120, that includes the unique identifier (e.g., IP address and open port number) and data characterizing the token register 104 of FIG. 2. In response, node 1 establishes a communication link with node 2 as indicated by an arrow 122. As illustrated in FIG. 2F, a subsequent multicast identification message 110 (also illustrated in FIG. 2A) broadcast by node 1 provides data characterizing the token register 104 of node 1. It is noted that throughout FIGS. 2A-2N, the same reference numbers are employed with different arrows to indicate different endpoints for the same multicast identification message. For example, the multicast identification message 110 is broadcast by node 1 to both node 3 and node 2.

In response to the multicast identification message broadcast 110 by node 1, node 2 modifies its token register 104. More particularly, node 2 adds node 1 to the token register 104 of node 2 along with the given indication that the communication link 122 has been established with node 1. Additionally, node 2 adds node 3 to the token register 104 of node 2 along with another indication that a communication link has not been established with node 3. As illustrated in FIG. 2E, nodes 102 on the mesh network for which a communication link has not been established are represented in token registers 104 with inverted coloring, as indicated by reference number 126.

In FIG. 2F, in response to the multicast identification message 110 from node 1, node 2 establishes a communication link with node 1, as indicated by an arrow 128. Additionally, in a subsequent multicast identification message 120 broadcast by node 2, node 2 provides data characterizing the token register 104 of node 2. In this situation, it is presumed that node 3 does not receive this particular multicast identification message. In response, node 1 adds node 2 to the token register 104 of node 1 along with the given indication that the communication link 122 has been established with node 2. Additionally, a subsequent multicast identification message 110 from node 1 with the data characterizing the token register 104 of node 1 is received at node 3. In response, node 3 adds node 2 to the token register 104 along with the other indication that a communication link is not established with node 2.

In FIG. 2G, a subsequent multicast identification message 120 broadcast by node 2 is received at node 3. In response, node 3 establishes a communication link with node 2 on the open port of node 2, as indicated by an arrow 130. Additionally, in a subsequent multicast identification message 114 broadcast by node 3, node 3 provides data characterizing the token register 104 of node 3 to node 2 (and node 1). In response, since the communication link 130 from node 3 to node 2 is established, node 2 changes the token register 104 of node 2 to indicate that the communication link 130 is established with node 3.

Further, as illustrated in FIG. 2H, in further response to the multicast identification message 114 broadcast by node 3, node 2 establishes a communication link with node 3 on the open port of node 3, indicated by an arrow 132. Further, in a subsequent multicast identification message 120, node 2 broadcasts the token register 104 to node 3 (and node 1). Since the communication link 132 is established from node 2 to node 3, in response, node 3 changes the token register 104 of node 3 to indicate that the communication link 132 is established with node 2.

Moreover, similar to the situation illustrated in FIG. 2D, in FIG. 2H, direct, bi-directional communication is established between each node 102 that is online. Accordingly, in an example where no additional nodes 102 come online within a threshold time (e.g., 5-10 seconds), the resultant mesh network is a fully connected mesh network between three (3) nodes 102. Thus, the mesh network is in the steady state, and in such a situation node 1, node 2 and node 3 reduce a rate of broadcasting the multicast identification messages from the transient state rate to the steady state rate. However, in FIG. 2I it is presumed that node 4 comes online causing node 1, node 2 and node 3 to return to the transient state.

More particularly, in FIG. 2I, upon node 4 coming online, as indicated by an arrow 140, node 4 broadcasts a multicast identification message that includes the unique identifier (e.g., IP address and open port number) and data characterizing the token register 104 of node 3. In the example illustrated in FIG. 2I, it is presumed that node 3 receives the multicast identification message from node 4, and that node 1 and node 2 do not receive the multicast identification message 140 from node 4. In response, node 3 establishes a communication link with node 4 as indicated by an arrow 142. As illustrated in FIG. 2I, in a subsequent multicast identification message 114 (also illustrated in FIG. 2A), node 3 provides data characterizing the token register 104 of node 3. In response, node 4 modifies its token register 104. More particularly, node 2 adds node 3 to the token register 104 of node 2 along with the given indication that the communication link 142 has been established with node 4. Additionally, node 4 adds node 1 and node 2 to the token register 104 along with the other indication that a communication link has not been established with node 1 or node 2. Further, node 1 and node 2 each modify their corresponding token registers 104 to add an indication that node 4 is a node on the mesh network, and that a communication link with node 4 has not been established.

As illustrated by FIG. 2J, a subsequent multicast identification message 114 is received by node 4, and in response, node 4 opens a communication link, indicated by an arrow 144 with node 4. Moreover, a subsequent multicast identification message 140 broadcast by node 4 is received by node 2 and node 3, and not by node 1. In response, node 3 modifies its token register 104 to indicate the communication link 144 has been established with node 4. Additionally, in a manner described herein, node 2 establishes a communication link indicated by an arrow 150 on the open port of node 4 identified in the multicast identification message 140 and node 2 broadcasts a subsequent multicast identification message 120. In response to the multicast identification message 120 from node 2 since the communication link 150 is established from node 2 to node 4, node 4 modifies its token register 104 to include the given indication that the communication link 150 has been established to node 2.

Further still, in response to the multicast identification message 120 from node 2, node 4 establishes a communication link, indicated by an arrow 152 with node 2. Moreover, in response to a subsequent multicast identification message 140 broadcast from node 4, node 2 modifies its token register 104 to include the given indication that the communication link 154 is established with node 4.

As illustrated in FIG. 2K, a subsequent multicast identification message 140 broadcast by node 4 is received by node 1, node 2, node 3 and node 4. In response, node 1 opens a communication link indicated by an arrow 154 with node 4. Additionally, in response to receipt of a subsequent multicast identification message 110 from node 1, node 4 modifies its token register 104 to include the given indication that the communication link 154 has been established with node 1. Additionally, in response to the subsequent multicast identification message 110 broadcast by node 1, which is received at node 4 (as well as node 2 and node 3). In response, node 4 opens a communication link indicated by an arrow 156 on the open port of node 4. In response to a subsequent multicast identification message 140 broadcast by node 4, node 1 modifies its token register 104 to include the given indication that the communication link 154 has been established with node 4.

Moreover, similar to the situation illustrated in FIGS. 2D and 2H, in FIG. 2K direct, bi-directional communication is established between each node 102 that is online. Accordingly, in an example where no additional nodes 102 come online within a threshold time (e.g., 5-10 seconds), the resultant mesh network is a fully connected mesh network between three (3) nodes 102. Thus, the mesh network is in the steady state, and in such a situation node 1, node 2, node 3 and node 4 reduce a rate of broadcasting the multicast identification messages from the transient state rate to the steady state rate.

Further, in FIG. 2L, it is presumed that node 4 goes offline in a non-determinate manner. As some examples, node 4 may go offline due to a software crash. In other examples, node 4 may go offline due to a hardware failure, such as damage to an aircraft carrying hardware for node 4. In such a situation, multicast identification messages that are broadcast by node 1, node 2 and node 3, are not received by node 4, as indicated by the dashed lines at 110, 114 and 152. Additionally, at some point, node 1 attempts to communicate with node 4 via the communication link 154. Further, node 2 attempts to communicate with node 4 via the communication link 152 and node 3 attempts to communication with node 4 via the communication link 142. Since node 4 is offline, each of the communication links 142, 152 and 154 are severed, as indicated by the dashed lines 142, 152 and 154. Accordingly, in this situation, node 1, node 2 and node 3 switch back to the transient mode, increasing the rate of broadcast of the multicast identification messages from the steady-state rate to the transient state rate.

As illustrated in FIG. 2M, upon detecting that node 4 is offline, node 1, node 2 and node 3 modify their respective token registers 104 to indicate that node 4 is a node on the mesh network, but that a communication link has not been established with node 4. Further, after a predetermined amount of time (e.g., 5-10 seconds), as illustrated in FIG. 2N, node 1, node 2 and node 3 modify their respective token registers 104 to remove node 4 from the mesh network. Additionally, in an example where no additional nodes 102 come online within a threshold time (e.g., 5-10 seconds), the resultant mesh network is a fully connected mesh network between three (3) nodes 102. Thus, the mesh network is in the steady state, and in such a situation, node 1, node 2 and node 3 reduce a rate of broadcasting the multicast identification messages from the transient state rate to the steady state rate.

By employing the system 100 of FIGS. 2A-2N, each of the nodes 102 can be brought online and/or go offline in a non-deterministic order. Moreover, the middleware that facilitates communication of the nodes 102 can delay messages until each corresponding token register 104 indicates that a communication link has been established. In this manner, delays due to re-sending of messages and/or collisions on the mesh network can be curtailed. Furthermore, as demonstrated, the system 100 is serverless, such that no single point of failure of the system 100 exists. In fact, as demonstrated in FIGS. 2M-2N, each node 102 is configured to take remedial action in response to detecting another node 102 going offline.

Figure 3:
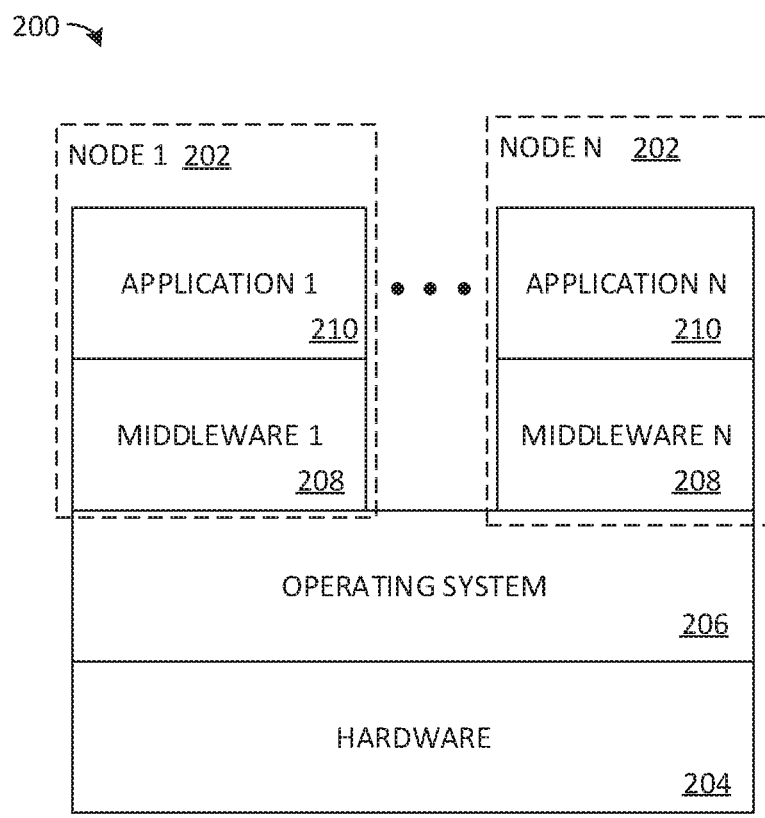
FIG. 3 illustrates an example of a computing platform that can support a node of a mesh network.

FIG. 3 illustrates an example of a computing platform 200 that can support N number of nodes 202, where N is an integer greater than or equal to one (1), such as the nodes 52 of FIG. 1 and/or 102 of FIGS. 2A-2N. The computing platform 200 includes hardware 204. In some examples, the hardware 204 includes a non-transitory memory (e.g., volatile memory and/or non-volatile memory) for storing machine readable instructions and a processing unit (e.g., one or more processor cores) for accessing the memory and executing the machine-readable instructions. In some examples, the memory can be implemented as a hard disk drive, a solid-state drive, flash memory, random access memory, or any combination thereof. In other examples, the hardware 204 can include a microcontroller with instructions embedded therein. Further, in other examples, the hardware 204 includes an application specific integrated circuit (ASIC) chip. The hardware 204 can also include an interface for communicating with other computing platforms, such as an Ethernet interface, a Wi-Fi interface, a Bluetooth interface, etc.

The computing platform 200 can include an operating system 206 that executes on the hardware 204. The operating system 206 can manage the hardware 204 and software resources and can provide common services for computer programs. Further, N number of instances of a middleware 208 (e.g., application software) can execute on the operating system 206. Each of the N number of instances of middleware 208 can be implemented on a corresponding node 202. The middleware 208 can facilitate communication between N number of applications 210, wherein each node 202 includes an application. More particularly, each instance of middleware 208 can direct network communications (e.g., TCP and/or UDP packets) from one application 210 to another, including situations where the two such applications are executing on separate computing platforms. Further, each middleware 208 instance can delay requests by a corresponding application 210 for communication with another application until a node corresponding to the application comes online. That is, the middleware 208 can prevent attempts by a given application 210 to communicate with an offline application. In some examples, the N number of instances of middleware 208 can provide an isolated runtime environment for the corresponding application 210.

Figure 4:
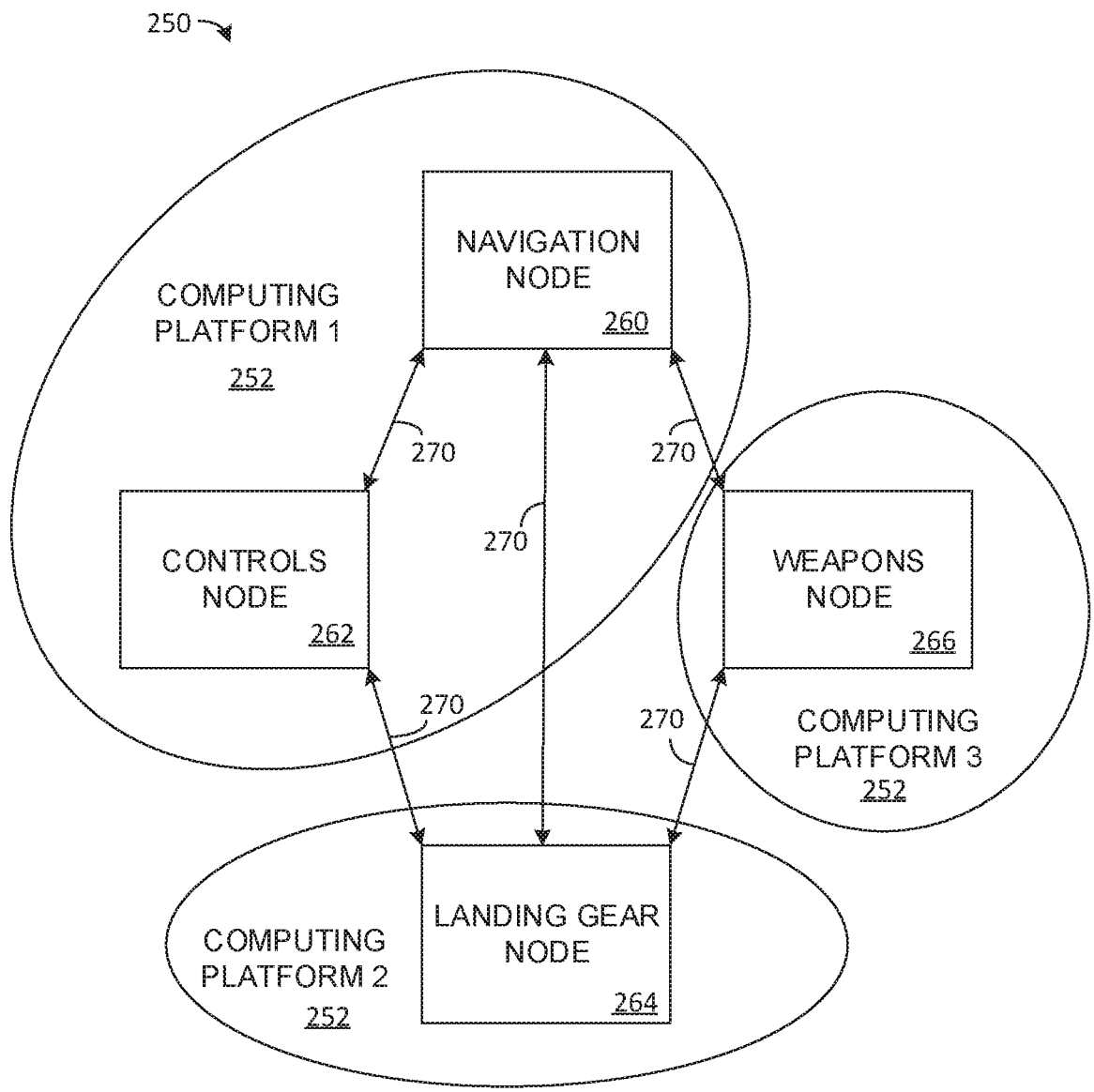
FIG. 4 illustrates an example of a system with a plurality of computing platforms for a plurality of nodes operating on an aircraft.

FIG. 4 illustrates an example of a system 250 that could be employed to implement the system 50 of FIG. 1 and/or the system 100 of FIGS. 2A-2N. Moreover, the system 250 includes three (3) computing platforms 252. Each computing platform 252 can be representative of an instance of the computing platform 200 of FIG. 3. The system 250 is provided as an example of software that could execute on a combat rated aircraft.

The system 250 includes nodes executing on each of the computing platforms 252. Each node could be representative of an instance of a node 52 of FIG. 1 and/or a node 102 of FIGS. 2A-2N. In the example illustrated in FIG. 4, computing platform 1 includes a navigation node 260 and a controls node 262. The navigation node 260 can include, for example, software for controlling a navigation system of the aircraft. The controls node 262 can represent software for pilot controls of the aircraft.

Computing platform 2 can include, for example, a landing gear node 264 that can be representative of software for controlling landing gear of the aircraft. Further, computing platform 3 can include a weapons node 266 for controlling operations of weapons systems for the aircraft. Each of the navigation node 260, the controls node 262, the landing gear node 264 and the weapons node 266 can be brought online or offline in a non-deterministic manner, as described herein. Moreover, as illustrated, a bi-directional communication links 270 (which can represent two one-way communication links) connect each node in the system 250 to every other node in the system 250. In this manner, the system 250 operates a fully-connected mesh network. Additionally, the resultant mesh network of the system 250 is serverless, such that the system 250 does not have a single point of failure.

Figure 5:
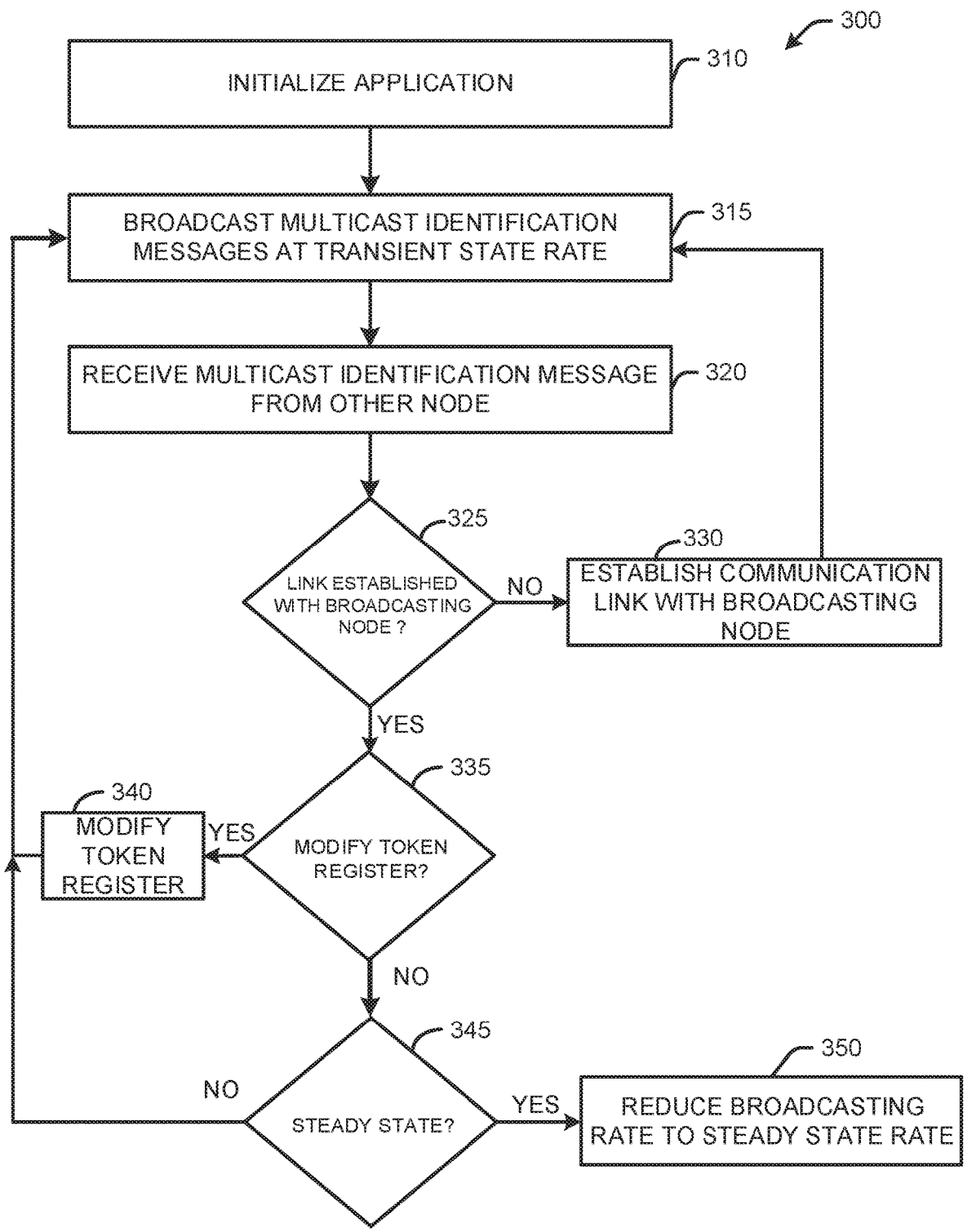
FIG. 5 illustrates an example of a method for establishing and maintaining a mesh network.

FIG. 5 illustrates an example of a method 300 for establishing and maintaining a mesh network amongst a plurality of nodes operating on a computing platform. The method 300 can be executed by a given node (e.g., a node 52 of FIG. 1 and/or a node 102 of FIGS. 2A-2N).

At 310, the given node initializes an application executing thereon, such that the given node is brought online. At 315, the node broadcasts multicast identification messages at a transient state rate. At 320, the node receives a multicast identification message broadcast by another node on the mesh network.

At 325, a determination is made as to whether a communication link has been established with the other node. If the determination at 325 is negative (e.g., NO), the method 300 proceeds to 330. If the determination at 325 is positive (e.g., YES), the method 300 proceeds to 335. At 330, the given node establishes a communication link with the other node that broadcast the multicast identification message at a communication port identified in the multicast identification message, and the method returns to 315.

At 335, a determination is made as to whether a node or multiple nodes are to be added to a token register of the given node. The determination can be based, for example, on a determination that the other node which broadcasted the multicast identification message is not in the token register of the given node and/or a third node not in the token register of the given node is identified in the multicast identification message broadcast by the other node. If the determination at 335 is positive (e.g., YES), the method 300 proceeds to 340. If the determination at 335 is negative (e.g., NO), the method 300 proceeds to 345. At 340, the given node modifies its token register based on the determination at 335. In particular, the token register at 340 records a given indication for each node of the mesh network that the given node has established communication with and another indication of each node on the mesh network for which communication has not been established, and the method 300 returns to 315.

At 345, another determination is made as to whether the mesh network has achieved a steady state. The determination at 345 can be based, for example, on an amount of time lapse since the token register of the given node was modified in response to a multicast identification message. If the determination at 345 is negative (e.g., NO), the method 300 can return to 315. If the determination at 345 is positive (e.g., YES), the method 300 proceeds to 350. At 350, the given node reduces the broadcasting rate of the multicast identification messages to a steady state rate (from the transient state rate).

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system for establishing a mesh network comprising:
one or more computing platforms that:
 initiates execution of a software application for each of a plurality of nodes, wherein each the plurality of nodes:
  establishes, by a respective node of the plurality of nodes, a communication link in the mesh network with another node of the plurality of nodes in response to a multicast identification message from the other node;
  records, in a token register, a given indication of each node in the plurality of nodes for which a communication link is established and another indication of each node of the plurality of nodes that is identified in one or more multicast identification messages with which a communication link is not established;
  broadcasts multicast identification messages on the mesh network in response to the initiation of a respective node, wherein a given multicast identification message from a respective node includes a given identifier for each node of the plurality of nodes for which the respective node established a communication link and another identifier for each node identified in the one or more multicast identification messages with which the respective node has not established a communication link; and
  reduces a rate of broadcasting the multicast identification messages from a transient state rate to a steady state rate in response to establishing a communication link with each of the other plurality of nodes.

2. The system of claim 1, wherein at least two of the plurality of nodes are initiated in a non-deterministic order.

3. The system of claim 1, wherein the multicast identification message provided by each respective node identifies an open communication port on the respective node.

4. The system of claim 3, wherein each node communicates via the Transmission Control Protocol (TCP).

5. The system of claim 1, wherein the one or more computing platforms comprises a middleware that facilitates communication between the plurality of nodes via the mesh network.

6. The system of claim 1, wherein each of the plurality of nodes further:
 detects a failed communication link between a respective node and a particular node;
 removes the particular node from the token register; and
 changes the rate of the broadcasting the multicast identification messages from the steady state rate to the transient state rate.

7. The system of claim 1, wherein the one or more computing platforms comprises a plurality of computing platforms.

8. The system of claim 1, wherein each of the plurality of nodes operate in an isolated runtime environment.

9. The system of claim 1, wherein the one or more computing platforms are implemented on an aircraft.

10. The system of claim 9, wherein a first node of the plurality of nodes comprises a navigation system, and a second node of the plurality of nodes comprises a weapons system.

11. A system for establishing a mesh network comprising:
 a plurality of nodes of the mesh network, wherein each of the plurality of nodes executes on one or more computing platforms, wherein, upon coming online, each of the plurality of nodes:
  broadcasts multicast identification messages on the mesh network, wherein each multicast identification message includes a unique identifier of a respective node and data characterizing a current state of a token register for the respective node;
  establishes, by a respective node of the plurality of nodes, a communication link in the mesh network with another node of the plurality of nodes in response to a multicast identification message from the other node; and
  records, in the respective token register, a given indication of each node in the plurality of nodes for which a communication link is established and another indication of each node of the plurality of nodes that is identified in one or more multicast identification messages for which a communication link is not established; and
  reduces a rate of broadcasting the multicast identification messages from a transient state rate to a steady state rate in response to establishing a communication link with each of the other plurality of nodes.

12. The system of claim 11, wherein at least two of the plurality of nodes are initiated in a non-deterministic order.

13. The system of claim 12, wherein each node communicates via the Transmission Control Protocol (TCP).

14. The system of claim 11, wherein the multicast identification message provided by each respective node identifies an open communication port on the respective node.

15. The system of claim 11, wherein each of the plurality of nodes further:
- detects a failed communication link between a respective node and a particular node;
- removes the particular node from the token register; and
- changes the rate of the broadcast messages from the steady state rate to the transient state rate.

16. A method for establishing a mesh network comprising:
- initiating, at a first node of a mesh network, execution of an application;
- broadcasting, after the initiating, a multicast identification message to each node on the mesh network;
- receiving, by the first node, a first multicast identification message broadcast by a second node on the mesh network;
- determining, by the first node, that a communication link is not established with the second node in response to receipt of the first multicast identification message;
- establishing, by the first node, a communication link with the second node on a port identified in the first multicast identification message broadcast by the second node in response to determining that a communication link is not established with the second node;
- receiving, by the first node, a second multicast identification message broadcast by the second node on the mesh network after the establishing;
- adding, by the first node, an indication that a communication link has been established with the second node in response to receipt of the second multicast identification message; and
- reducing, by the first node, a rate of broadcasting the multicast identification messages from a transient state rate to a steady state rate in response to establishing a communication link with each of the other plurality of nodes.

17. The method of claim 16, further comprising:
- adding, by the first node, an indication that a communication link has not been established with a third node identified in the first multicast identification message and/or the second multicast identification message.

18. The method of claim 17, wherein the first node, the second node and the third node of the mesh network are initiated in a non-deterministic order.

* * * * *